(12) United States Patent
Takahashi

(10) Patent No.: US 7,511,636 B2
(45) Date of Patent: Mar. 31, 2009

(54) DATA CONVERSION UNIT, DATA CONVERSION METHOD, AND ELECTRONIC APPARATUS USING THE DATA CONVERSION UNIT

(75) Inventor: Toshio Takahashi, Hiratsuka (JP)

(73) Assignee: Ricoh Company, Ltd., Tokyo (JP)

( * ) Notice: Subject to any disclaimer, the term of this patent is extended or adjusted under 35 U.S.C. 154(b) by 24 days.

(21) Appl. No.: 11/845,313

(22) Filed: Aug. 27, 2007

(65) Prior Publication Data

US 2008/0136685 A1 Jun. 12, 2008

(30) Foreign Application Priority Data

Aug. 30, 2006 (JP) ............... 2006-233017
Jun. 19, 2007 (JP) ............... 2007-161528

(51) Int. Cl.
*H03M 7/00* (2006.01)
(52) U.S. Cl. ............... 341/50; 341/100; 341/101; 713/193
(58) Field of Classification Search ............... 341/50
See application file for complete search history.

(56) References Cited

U.S. PATENT DOCUMENTS

2002/0019934 A1 * 2/2002 Ishizaki ............... 713/164
2005/0182951 A1 * 8/2005 Sohn ............... 713/189

FOREIGN PATENT DOCUMENTS

| EP | 1 610 211 A2 | 12/2005 |
| JP | 2003-6144 | 1/2003 |
| JP | 2004-106503 | 4/2004 |
| JP | 2005-346123 | 12/2005 |
| JP | 2006-18428 | 1/2006 |
| JP | 2006-508413 | 3/2006 |
| WO | WO 03/085535 A2 | 10/2003 |

OTHER PUBLICATIONS

"Product Overview Momentus 5400 FDE Hardware-Based Full Disc Encryption (FDE)", WWW.SEAGATE.COM, XP002459117, 2005, 2 pages, no month.

(Continued)

*Primary Examiner*—Khai M Nguyen
(74) *Attorney, Agent, or Firm*—Oblon, Spivak, McClelland, Maier & Neustadt, P.C.

(57) ABSTRACT

A data conversion unit includes a first input/output unit, a second input/output unit, an encoder, a decoder, a random number generator for generating random number data, and a control unit which selects a first, second and third setting function. The first setting function sets the data conversion unit to input data from the first input/output unit, encode data by the encoder, and output the encoded data from the second input/output unit. The second setting function sets the data conversion unit to input data from the first input/output unit, replace the data with the random number data generated by the random number generator, and output the random number data from the second input/output unit. The third setting function sets the data conversion unit to input encoded data from the second input/output unit, decode the encoded data by the decoder, and output the decoded data from the first input/output unit.

14 Claims, 10 Drawing Sheets

OTHER PUBLICATIONS

Hans Zetterstrom, "Deleting Sensitive Information Why hitting delete isn't enough", WWW.SANS.ORG, XP002459118, 2002, pp. 1-17.

Dave Anderson, "HDD Based Full Disc Encryption", WWW.THIC.ORG, XP002459119, Feb. 28-Mar. 1, 2006, pp. 1-12.

Beth Pariseau, "Encryption outside the box", HTTP://SEARCHSTORAGE.TECHTARGET.COM, XP002459120, Jul. 14, 2005, 2 pages.

Karen D. Schwartz, Seagate Introduces Hardware-Encryted Notebook Hard Drive, WWW.EWEEK.COM, XP002459121, Jun. 8, 2005, 2 pages.

Peter Gutmann, "Secure Deletion of Data From Magnetic and Solid-State Memory", WWW.CS.AUCKLAND.AC.NZ, XP002459122, Jul. 25, 1996, pp. 1-12.

"Powerful solution for secure data removal", WWW.COMPUAPPS.COM, XP002459123, 2005, 2 pages, no month.

* cited by examiner

DATA CONVERSION UNIT, DATA CONVERSION METHOD, AND ELECTRONIC APPARATUS USING THE DATA CONVERSION UNIT

CROSS-REFERENCE TO RELATED APPLICATIONS

This application claims priority from Japanese Patent Applications Nos. 2006-233017, filed on Aug. 30, 2006, and 2007-161528, filed on Jun. 19, 2007 in the Japan Patent Office, the entire contents of each of which are hereby incorporated by reference herein.

BACKGROUND OF THE INVENTION

1. Field of the Invention

The present disclosure relates to a data conversion unit, a data conversion method, and an electronic apparatus having such data conversion unit to enhance data processing.

2. Description of the Background Art

Conventionally, an electronic apparatus such as a copier, printer, facsimile, or multi-functional apparatus having copying/printing/facsimile functions may exchange data with an external memory unit via an interface such as a parallel interface or a serial interface. The external memory unit may be a non-volatile memory card, a hard disk unit, an optical recording medium or the like, for example.

When it is necessary to enhance the performance of such an electronic apparatus, such as its data-security capabilities, an encoding/decoding capability or function for exchanging data with the external memory unit is added. Specifically, such an encoding/decoding function is installed in the electronic apparatus by replacing a controller board of the electronic apparatus, by installing a software program for encoding/decoding, or by connecting a data encoding/decoding device to the electronic apparatus via an expansion slot of the electronic apparatus as an optional device, for example.

However, such methods have certain drawbacks, as described below.

For example, if a software program is installed in an electronic apparatus to add an encoding/decoding function, a CPU (central processing unit) of the electronic apparatus may need to allocate some of its processing capacity to process such added encoding/decoding function. Consequently, the CPU may not achieve a particular data transmission speed originally designed for the CPU, and as a result, the electronic apparatus may fail to process data at a preferred processing speed.

If a high-performance CPU is originally installed in the electronic apparatus, such high-performance CPU can process data at such preferred processing speed even if a software program is installed in the electronic apparatus. However, if no additional function is added to the electronic apparatus, such high-performance CPU may not be used effectively, thus reducing the cost performance of the electronic apparatus because such high-performance CPU is a relatively expensive device.

Further, although inserting an optional device (e.g., data encoding/decoding device) into an expansion slot of the electronic apparatus can enhance the performance of the electronic apparatus, if the electronic apparatus does not have a sufficient number of expansion slots which can be used for accommodating such add-on optional device, such optional device might not be added to the electronic apparatus. Consequently, depending on a hardware configuration of the electronic apparatus, such optional device might never be added to the electronic apparatus.

SUMMARY OF THE INVENTION

The present invention provides a data conversion unit including a first input/output unit, a second input/output unit, an encoder for encoding data, a decoder for decoding data, a random number generator for generating random number data, and a control unit. The control unit selects a first setting function, a second setting function, and a third setting function. In the first setting function, the control unit sets the data conversion unit to input data from the first input/output unit, to encode data by the encoder, and to output the encoded data from the second input/output unit. In the second setting function, the control unit sets the data conversion unit to input data from the first input/output unit, replace the data with the random number data generated by the random number generator, and output the random number data from the second input/output unit. In the third setting function, the control unit sets the data conversion unit to input encoded data from the second input/output unit, decode the encoded data by the decoder, and output the decoded data from the first input/output unit. The control unit selects any one of the first setting function, the second setting function, and the third setting function based on a setting state set to the control unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
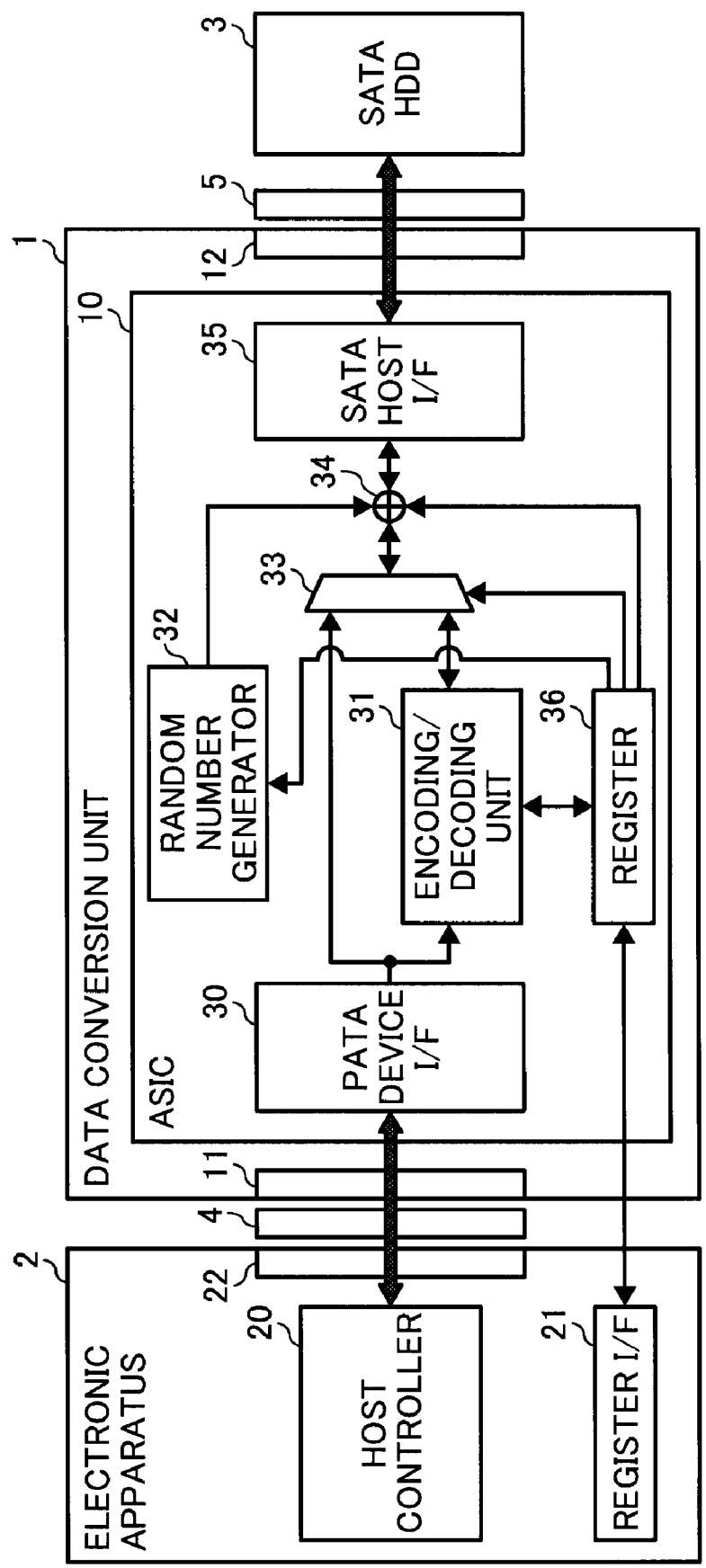
FIG. 1 is a block diagram of a data conversion unit according to an example embodiment.

The accompanying drawings, which are not to be considered as drawn to scale unless explicitly noted and wherein identical or similar reference numerals designate identical or similar components throughout the several views, are intended to depict example embodiments of the present disclosure and should not be interpreted to limit the scope thereof.

DETAILED DESCRIPTION OF EXAMPLE EMBODIMENTS

A description is now given of example embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing example embodiments shown in the drawings, specific terminology is employed for the sake of clarity, the present disclosure is not limited to the specific terminology so selected and it is to be understood that each specific element includes all technical equivalents that operate in a similar manner.

Figure 2:
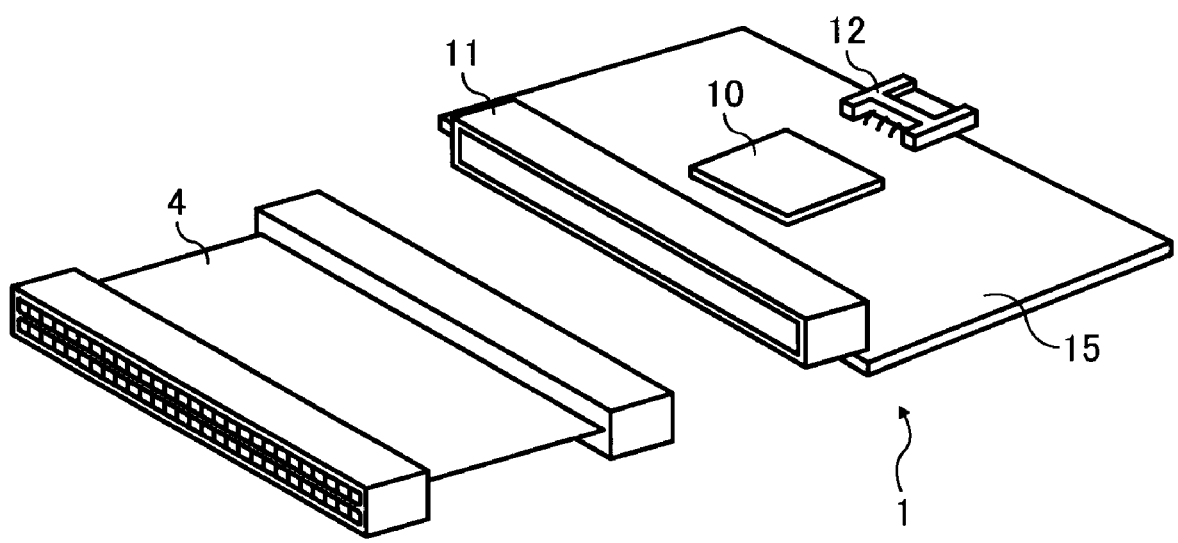
FIG. 2 is a perspective view of a data conversion unit according to an example embodiment.

Referring now to the drawings, a data conversion unit according to an example embodiment is described with particular reference to FIGS. 1 and 2.

FIG. 1 is a block diagram of a data conversion unit 1 according to an example embodiment and FIG. 2 is a perspective view of the data conversion unit 1.

As shown in FIG. 2, the data conversion unit 1 includes a board 15, an ASIC (application specific integrated circuit) 10, a parallel ATA (PATA) connector 11, and a serial ATA (SATA) connector 12, for example.

ATA is an acronym for Advanced Technology Attachment, a standard of IDE (Integrated Drive Electronics) for connecting hard drives to computer systems set by American National Standards Institute (ANSI).

The parallel ATA (PATA) connector 11 may include a SCSI (small computer system interface), and the serial ATA (SATA) connector 12 may include an RS-232C (recommended standard 232 version C), for example.

As shown in FIG. 1, the data conversion unit 1 is connected to an electronic apparatus 2 having a PATA interface via a PATA cable 4 and the PATA connector 11.

The electronic apparatus 2 may for example be a copier, printer, a facsimile, or a multi-functional apparatus having copying/printing/facsimile functions.

The data conversion unit 1 is connected to an external memory unit having SATA interface via a SATA cable, not shown, and the SATA connector 12. The external memory unit is, for example, a hard disk drive unit (HDD), an optical disk unit, or the like.

The above-described connection configuration enables the electronic apparatus 2 having a PATA interface to exchange data or information with the external memory unit having an SATA interface.

Further, the data conversion unit 1 has, for example, one or more security functions, such as an encoding function for encoding data to be written to the external memory unit, a decoding function for decoding encoded data stored in the external memory unit, a data deleting function for deleting data stored in the external memory unit by overwriting random number data on the stored data, and the like.

With the data conversion unit 1 described above, the electronic apparatus 2 can be easily given a data encoding/decoding function for protecting data to be stored in the external memory unit as well as a data deleting function for deleting data stored in the external memory unit by overwriting the data stored in the external memory unit with random number data. The ASIC 10 shown in FIG. 1 is used to implement such function.

As shown in FIG. 1, one terminal of the PATA cable 4 is connected to the PATA connector 11 provided on the board 15 of the data conversion unit 1 and another terminal of the PATA cable 4 is connected to a PATA interface 22 of the electronic apparatus 2. Such connection configuration enables the data conversion unit 1 and the electronic apparatus 2 to exchange data with each other in a parallel manner.

As also shown in FIG. 1, one terminal of a SATA cable 5 is connected to a SATA connector 12 of the data conversion unit 1 and another terminal of the SATA cable 5 is connected to a hard disk drive unit 3 (SATAHDD 3) having a SATA interface, not shown. Such connection configuration enables the data conversion unit 1 and the SATAHDD 3 to exchange data with each other serially. Hereinafter, the hard disk drive unit 3 with serial interface is referred as SATAHDD 3.

Accordingly, the electronic apparatus 2 and the SATAHDD 3 having different interfaces are coupled to each other with the data conversion unit 1 interposed therebetween. In other words, the data conversion unit 1 is used to enable data transmission between the electronic apparatus 2 and the SATAHDD 3 having different interfaces.

As shown in FIG. 1, the ASIC 10 may include a PATA device interface (I/F) 30, an encoding/decoding unit 31, a random number generator 32, a first selector 33, a second selector 34, a SATA host interface (I/F) 35, and a register 36, for example.

The PATA device I/F 30 is used for parallel input or output of data with the electronic apparatus 2. The PATA device I/F 30 is termed "first input/output unit."

The encoding/decoding unit 31 may include an encoder for encoding data input via the PATA device I/F 30 and a decoder for decoding encoded data input via a SATA host I/F 35. Such encoding/decoding unit 31 may use encoding/decoding algorithms such as AES (advanced encryption standard), DES (data encryption standard) or the like, for example.

It should be noted that such ASIC 10 having the above-described data encoding/decoding function encodes and/or decodes only data, and does not convert commands or instructions, for example.

The random number generator 32 generates random number data, which is used to replace data input via the PATA device I/F 30, for example.

The first selector 33 receives data from the PATA device I/F 30 or the encoding/decoding unit 31 based on a setting of the register 36, and selectively outputs such data to the second selector 34.

Further, the first selector 33 receives data from the second selector 34, and selectively outputs data to either the PATA device I/F 30 or the encoding/decoding unit 31.

The second selector 34 receives data from the first selector 33, which is output from the first selector 33 without any data processing, or data from the first selector 33, which is processed with random number data output from the random number generator 32. The second selector 34 selectively outputs such data to the SATA host I/F 35 based on a setting of the register 36.

Further, the second selector 34 receives data from the SATA host I/F 35 and outputs data to the first selector 33.

The SATA host I/F 35 inputs and outputs data serially with the SATAHDD 3. The SATA host I/F 35 is termed "second input/output unit."

The register 36 is used to set a mode or a parameter to the encoding/decoding unit 31 or random number generator 32, and to set a mode for data path selection for the first selector 33 and the second selector 34 based on settings for mode and parameter transmitted from a register interface (I/F) 21 of the electronic apparatus 2.

The register 36 is used to set any one of a first setting function, a second setting function, and a third setting function.

The first setting function is used to set a state to input data to the PATA device I/F 30 from the electronic apparatus 2, to encode the data by the encoding/decoding unit 31, and to output data to the SATAHDD 3 via the SATA host I/F 35.

The second setting function is used to set a state to input data to the PATA device I/F 30 from the electronic apparatus 2, to replace the data with random number data generated by the random number generator 32, and to output the random number data to the SATAHDD 3 via the SATA host I/F 35.

The third setting function is used to set a state to input encoded data from the SATAHDD 3 via the SATA host I/F 35, to decode the encoded data by the encoding/decoding unit 31, and to output the decoded data to the electronic apparatus 2 via the PATA device I/F 30.

The register 36 is used to select any one of the first setting function, second setting function, and third setting function based on a setting set to the register 36 from the electronic apparatus 2.

Although the register 36 is connected to the electronic apparatus 2 via the register I/F 21, which is a different interface from the PATA device I/F 30, the register 36 is accessed from the electronic apparatus 2 via the PATA device I/F 30 by using extended commands for PATA and SATA, in which case the register I/F 21 is not used.

The electronic apparatus 2 is connected to a plurality of client computers, and is operated with instructions transmitted from the client computers, for example.

Such electronic apparatus 2 may have a plurality of application functions, such as image processing, image producing, data transmission, and so forth.

Such electronic apparatus 2 may be an image forming apparatus such as a copier, printer, facsimile, or multi-functional apparatus having a copying/printing/facsimile functions. The electronic apparatus 2 may have a device (e.g., memory, hard disk) for implementing such application functions. Further, the electronic apparatus 2 may be a personal computer.

The electronic apparatus 2 may include a host controller 20, the register I/F 21, and the PATA interface 22 as shown in FIG. 1. The host controller 20 may include a microcomputer for controlling the electronic apparatus 2.

The electronic apparatus 2 outputs a read command to the data conversion unit 1 from the host controller 20 to read out and obtains data stored in the external memory unit via the data conversion unit 1.

Further, the electronic apparatus 2 outputs a write command and to-be-written data to the data conversion unit 1 to write data to the external memory unit via the data conversion unit 1. During such writing process, the register I/F 21 outputs information for setting the mode and the parameter to the register 36 in the data conversion unit 1.

A description is now given of activation of the data conversion unit 1 and electronic apparatus 2.

First, the electronic apparatus 2 and the SATAHDD 3 are coupled to each other by connecting the data conversion unit 1 to the electronic apparatus 2 and the SATAHDD 3.

After supplying power to the electronic apparatus 2 and the SATAHDD 3, the host controller 20 of the electronic apparatus 2 recognizes the ASIC 10 of the data conversion unit 1 as a HDD (hard disk drive) or the like, and configures or initializes the data conversion unit 1 as an HDD.

As described above, the host controller 20 configures or initializes the PATA device I/F 30 and the SATAHDD 3. The host controller 20 is also used to control the electronic apparatus 2 as a whole.

Until the configuration or initialization of the PATA device I/F 30 is completed, the encoding/decoding unit 31, the random number generator 32, and the SATA host I/F 35 in the data conversion unit 1 are in a deactivated state.

Further, the register I/F 21 of the electronic apparatus 2 sets mode and parameter conditions to the register 36 in the data conversion unit 1. Specifically, the register 36 is used to set mode and parameter conditions to the encoding/decoding unit 31, to set data-path selection mode for the first selector 33 and second selector 34, and to set mode and parameter conditions for the random number generator 32.

As described above, the host controller 20 configures or initializes the SATA host I/F 35 and the SATAHDD 3.

When mode and parameter are set to the register 36 in the data conversion unit 1, the mode and the parameter are set to each unit in the data conversion unit 1 based on the mode and parameter set to the register 36.

Figure 3:
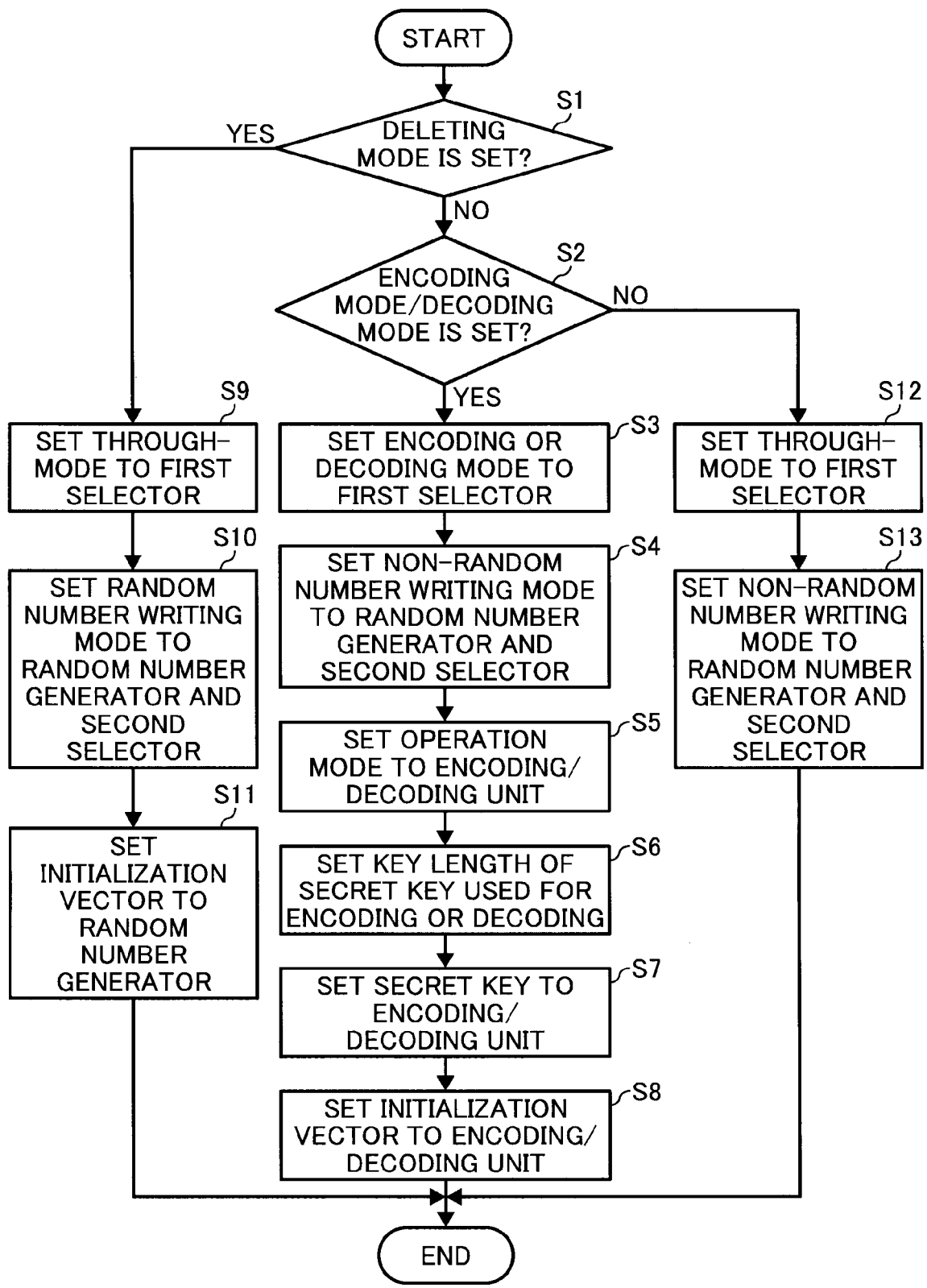
FIG. 3 is a flow chart illustrating a process for setting a mode or a parameter to an ASIC in a data conversion unit shown in FIG. 2.

FIG. 3 is a flow chart illustrating a process of setting mode or parameter conditions to the ASIC 10 of the data conversion unit 1 in FIG. 2.

For ease of explanation, in the following description a CPU (central processing unit) is used to control processing and make determinations.

In step S1, the CPU determines whether a deleting mode using random number data is set to the register 36.

If the CPU determines that a deleting mode is not set to the register 36 (No at step S1), in step S2 the CPU determines whether an encoding mode/decoding mode is set to the register 36.

If the CPU determines that an encoding mode or decoding mode is set to the register 36 in step S2 (Yes at step S2), in step S3 the CPU sets an encoding mode or decoding mode to the first selector 33.

In step S3, the encoding mode is performed as follows: Data input from the electronic apparatus 2 to the PATA device I/F 30 is encoded by the encoding/decoding unit 31, and such encoded data is output to the SATAHDD 3 via the SATA host I/F 35 by selecting a data path for such data transmission. Such encoding process corresponds to the above-mentioned first setting function, which is settable by the register 36.

In step S3, the decoding mode is performed as follows: Encoded data input from the SATAHDD 3 to the SATA host I/F 35 is decoded by the encoding/decoding unit 31, and such decoded data is output to the electronic apparatus 2 via the PATA device I/F 30 by selecting a data path for such data transmission. Such decoding process corresponds to the above-mentioned third setting function, which is settable by the register 36.

In step S4, the CPU sets a non-random-number writing mode to the random number generator 32 and the second selector 34 based on the mode set to the second selector 34.

If the non-random-number writing mode is set, the random number generator 32 does not generate random number data, and the second selector 34 outputs data, input from the first selector 33, to the SATA host I/F 35 as is. "As is" means that data is output from the second selector 34 to the SATA host I/F 35 without encoding/decoding processing of data input from the first selector 33. Hereinafter, "as is" is used to indicate that data is not subjected to specific processing, such as, for example, the encoding/decoding process.

In step S5, the CPU sets an operation mode to the encoding/decoding unit 31 based on the parameter set to the register 36.

Such operation mode is a type of encoding or decoding method. For example, in ECB (electronic code block) mode, data is divided into blocks and each block encoded or decoded separately with a secret key.

In CBC (cipher block chaining) mode, one block is XORed with the previous encoded block before being encoded with a secret key. Because the first block has no preceding block, the first block is XORed with an initialization vector.

In step S6, the CPU sets a key length of a secret key used for encoding or decoding by the encoding/decoding unit 31. The key length is a particular length, such as 128-bit, 192-bit, or 256-bit, based on a parameter set to the register 36.

In step S7, the CPU sets a value of the secret key to the encoding/decoding unit 31 based on the parameter set to the register 36.

In step S8, the CPU sets the initialization vector to the encoding/decoding unit 31. Step S8 is performed when an encoding or decoding is performed in CBC mode in the encoding/decoding unit 31 based on the parameter set to the register 36.

If the CPU determines that a deleting mode is set to the register 36 (Yes at step S1), the CPU sets a through-mode to the first sector 33 in step S9.

In the through-mode, data input to the PATA device I/F 30 from the electronic apparatus 2 is output to the second selector 34 as is based on the mode set to the register 36.

In step S10, the CPU sets a random-number writing mode to the random number generator 32 and the second selector 34.

If the random-number writing mode is set, then based on the parameter set to the register 36 the random number generator 32 generates random number data and outputs such random number data to the second selector 34 and the second selector 34 outputs random number data to the SATA host I/F 35, in which data from the first selector 33 is replaced by random number data output from the random number generator 32 and random number data is output to the SATA host I/F 35.

In step S11, the CPU sets the value of the initialization vector, which is used by the random number generator 32 when the random number generator 32 generates random number data.

Further, if the CPU determines that an encoding mode or decoding mode is not set in step S2 (No at step S2), the CPU sets a through-mode to the first selector 33 in step S12 based on a mode set to the register 36.

In through-mode, data input to the PATA device I/F 30 from the electronic apparatus 2 is output to the second selector 34 as is by selecting a data path.

In step S13, the CPU sets a non-random-number writing mode to the random number generator 32 and the second selector 34 based on the mode set to the register 36.

If the non-random-number writing mode is set, the random number generator 32 does not generate random number data, and the second selector 34 outputs data, input from the first selector 33, to the SATA host I/F 35 as is.

With such process, initialization of the data conversion unit 1 is completed.

A description is now given of an encoding process for data to be written to the SATAHDD 3 from the electronic apparatus 2 via the data conversion unit 1.

After initializing the PATA device I/F 30 of the data conversion unit 1, the electronic apparatus 2 sets mode or parameter information to the register 36 of the data conversion unit 1 with the register I/F 21. Such mode or parameter information includes, for example, an encoding mode, a type of encoding mode (e.g., CBC mode, ECB mode), a parameter of key length (or encryption key length) for encoding, a parameter of secret key (or encryption key), and a parameter of initialization vector.

Based on the mode and the parameter set to the register 36, the data conversion unit 1 sets an encoding mode to the first selector 33, sets a non-random-number writing mode to the random number generator 32 and the second selector 34, and sets a type of encoding mode (e.g., ECB mode, CBC mode), a key length for encoding, and a secret key for encoding to the encoding/decoding unit 31. If the type of encoding mode is CBC mode, the data conversion unit 1 sets an initialization vector for the encoding/decoding unit 31.

After such setting, the host controller 20 of the electronic apparatus 2 outputs data to the PATA device I/F 30 of data conversion unit 1.

The encoding/decoding unit 31 encodes such data, and outputs the encoded data to the SATA host I/F 35 via the first selector 33 and the second selector 34. The SATA host I/F 35 outputs such encoded data to the SATAHDD 3, by which encoded data is written to the SATAHDD 3.

Thus, as described above, the data conversion unit 1 can effectively provide a data encoding function to the electronic apparatus 2 easily.

A description is now given of a data decoding and data read-out process for encoded data stored in the SATAHDD 3 by the electronic apparatus 2 via the data conversion unit 1.

After initializing the PATA device I/F 30 of the data conversion unit 1, the electronic apparatus 2 sets mode or parameter information to the register 36 of the data conversion unit 1 with the register I/F 21. Such mode or parameter information may include a decoding mode, a type of encoding mode (e.g., CBC mode, ECB mode), a parameter of key length (or encryption key length) for encoding, a parameter of secret key (or encryption key), and a parameter of initialization vector.

Based on the mode and the parameter set to the register 36, the data conversion unit 1 sets a decoding mode to the first selector 33, sets a non-random-number writing mode to the random number generator 32 and the second selector 34, and sets a type of encoding mode (e.g., ECB mode, CBC mode), a key length for encoding, and a secret key for encoding to the encoding/decoding unit 31. If the type of encoding mode is CBC mode, the data conversion unit 1 sets an initialization vector for the encoding/decoding unit 31.

After such setting, the host controller 20 of the electronic apparatus 2 issues a read command to read encoded data from the SATAHDD 3.

When such encoded data is output to the data conversion unit 1 via the SATA host I/F 35, the second selector 34 outputs such encoded data to the first selector 33 as is. The first selector 33 also outputs such encoded data to the encoding/decoding unit 31 as is.

The encoding/decoding unit 31 decodes such data, and outputs the decoded data to the electronic apparatus 2 via the PATA device I/F 30.

Thus, as described above, the data conversion unit 1 can effectively provide a data decoding function for encoded data to the electronic apparatus 2 easily.

A description is now given of a data writing process and data read-out process between the electronic apparatus 2 and SATAHDD 3 carried out without encoding or decoding the data.

In the data writing process, after initializing the PATA device I/F 30 of the data conversion unit 1, the electronic apparatus 2 sets mode or parameter information to the register 36 of the data conversion unit 1 with the register I/F 21. Such mode or parameter information may include a through-mode and a non-random-number writing mode.

Based on the mode and the parameter set to the register 36, the data conversion unit 1 sets a through-mode to the first selector 33, and sets a non-random-number writing mode to the random number generator 32 and the second selector 34.

After such setting, the host controller 20 of the electronic apparatus 2 outputs data to the PATA device I/F 30 of the data conversion unit 1.

Such data is output to the SATA host I/F 35 via the first selector 33 and the second selector 34, and such data is output from the SATA host I/F 35 to the SATAHDD 3, by which data is written in the SATAHDD 3 as is.

In the data read-out process, the host controller 20 of the electronic apparatus 2 issues a read command to read encoded data from the SATAHDD 3.

When such encoded data is output to the data conversion unit 1 via the SATA host I/F 35, the second selector 34 outputs such data to the first selector 33 as is, and the first selector 33 outputs such data to the PATA device I/F 30 as is. Accordingly, such data read out from the SATAHDD 3 is output to the electronic apparatus 2 via the PATA device I/F 30 as is.

A description is now given of a data deleting process for data stored in the SATAHDD 3 with overwriting random number data.

After initializing the PATA device I/F 30 of the data conversion unit 1, the electronic apparatus 2 sets mode or parameter information to the register 36 of the data conversion unit 1 with the register I/F 21. Such mode or parameter information may include a through-mode, a random-number writing mode, and a parameter of initialization vector for generating random number data.

Based on the mode and the parameter set to the register 36, the data conversion unit 1 sets a through-mode to the first selector 33, sets a random-number writing mode to the random number generator 32 and second selector 34, and sets a parameter of the initialization vector to the random number generator 32.

After such setting, the host controller 20 of the electronic apparatus 2 outputs data to the PATA device I/F 30 of the data conversion unit 1. Then, such data is output to the second selector 34 via the first selector 33.

Because the second selector 34 receives random number data generated by the random number generator 32, the second selector 34 replaces data input from the first selector 33 with random number data received from the random number generator 32, and outputs such random number data to the SATA host I/F 35.

Such random number data is output from the SATA host I/F 35 to the SATAHDD 3, by which data in the SATAHDD 3 is overwritten with random number data so as to delete the data in the SATAHDD 3.

Thus, as described above, the data conversion unit 1 can effectively provide a data deleting function using random number data to the electronic apparatus 2 easily.

It should be noted that, when reading out data from the SATAHDD 3, such data may be read in a manner different from that described above. For example, a start position and a length of data to be read out may vary case by case. For example, an entire file needs to be read out in one case whereas only a portion of a file needs to be read out in another.

Accordingly, if a single file is encoded as a whole, an inconvenience may occur when decoding data in that one file depending on the type of encoding mode.

For example, if data X in one file needs to be read out, data preceding data X may need to be decoded. Such a condition may increase decoding time if data X is in a latter part of the file, which is inconvenient for a user.

Such inconvenient condition may be remedied by encoding/decoding data in discrete data units set in advance.

For example, a minimum recording length may be set for data to be recorded to the external memory unit. Such minimum recording length may then be encoded/decoded as one data unit. For example, the external memory unit may be divided into sectors of minimum recording length for the encoding/decoding process. For example, a hard disk unit may have sectors of 512-byte as the minimum recording length.

Such minimum recording length is termed a "minimum data amount" to be processed in a single processing.

Figure 4:
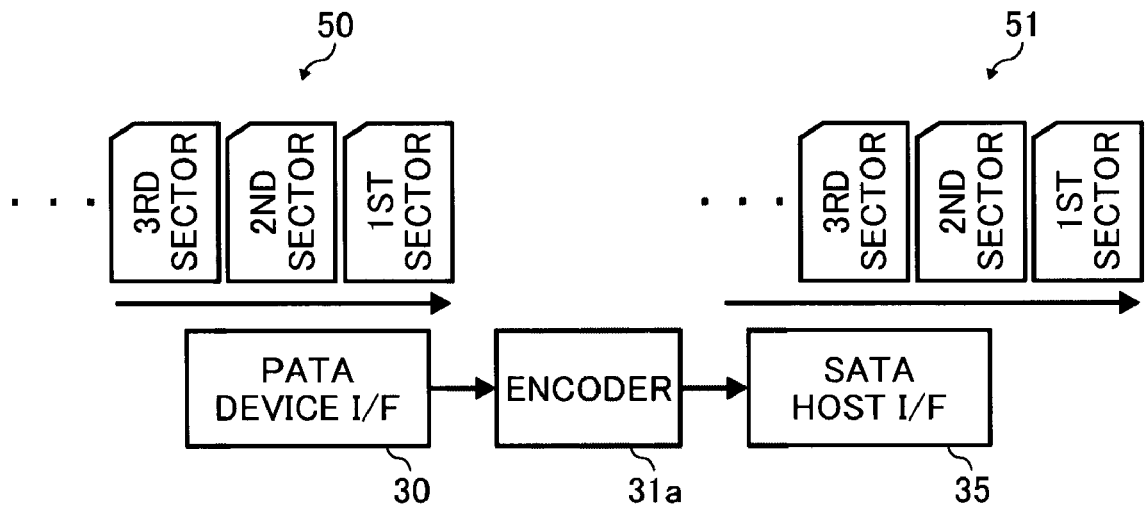
FIG. 4 is a schematic view illustrating data flow when a data conversion unit encodes data sector by sector.

FIG. 4 shows a data encoding process performed on a sector-by-sector basis.

As shown in FIG. 4, the electronic apparatus 2 transmit data 50 to the PATA device I/F 30 sector by sector, i.e., first sector, second sector, third sector, and so on. The encoding/decoding unit 31 has an encoder 31a, which encodes data sector by sector and writes encoded data 51 to the SATAHDD 3 via the SATA host I/F 35 sector by sector, i.e., first sector, second sector, third sector, and so on.

Figure 5:
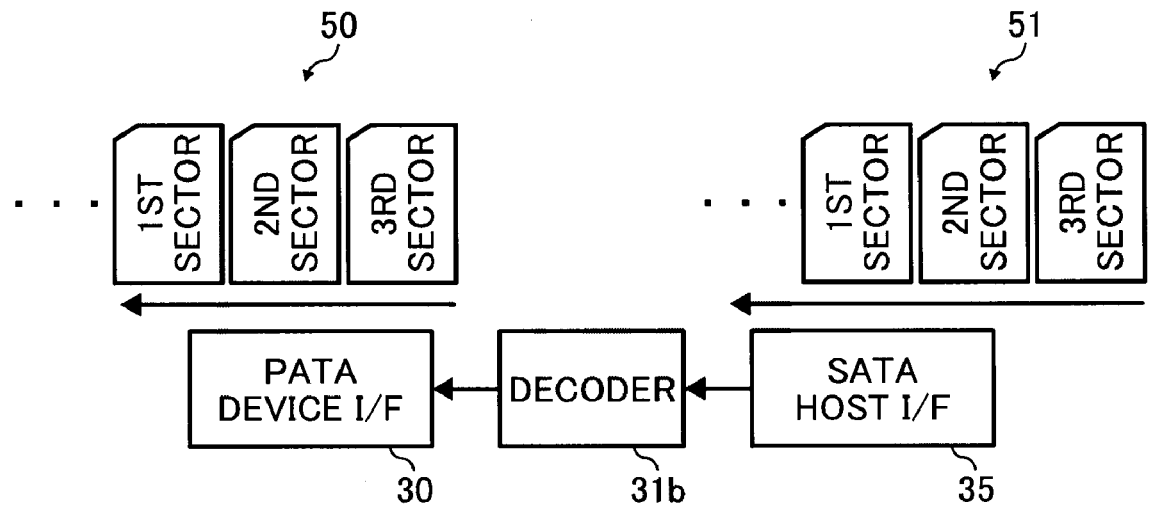
FIG. 5 is a schematic view illustrating data flow when a data conversion unit decodes data sector by sector.

FIG. 5 shows a process of decoding encoded data encoded sector by sector.

As shown in FIG. 5, the encoded data 51, read out from the SATAHDD 3 sector by sector, i.e., first sector, second sector, third sector, and so on, is input to the SATA host I/F 35. The encoding/decoding unit 31 has a decoder 31b, which decodes data sector by sector and transmits decoded data 50 to the electronic apparatus 2 via the PATA device I/F 30 sector by sector, i.e., first sector, second sector, third sector, and so on.

With such decoding process, target data to be read out can be decoded more quickly.

Further, when reading out encoded data, given data at a given position can be read out from such given position without reading out a whole file from a first top data, thus enabling processing time for data read-out to be reduced and allowing data read-out processing to be performed more efficiently.

Further, when reading out encoded data, a desired amount of data in one file can be read out from a given position.

In the foregoing description, the data conversion unit 1 has a PATA interface as the connecting interface for the electronic apparatus 2, and a SATA interface as the connecting interface for the SATAHDD 3 (or external memory unit).

Figure 6:
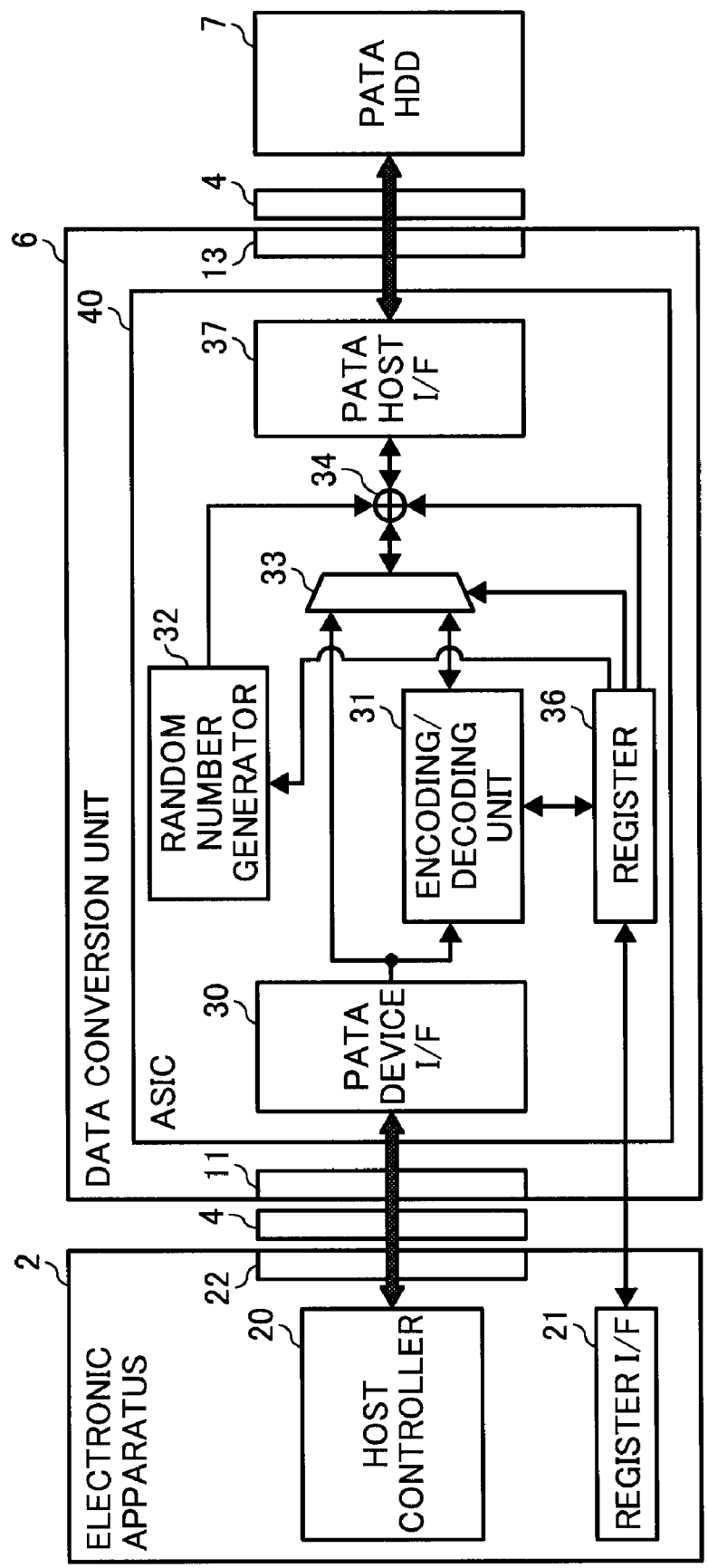
FIG. 6 is a block diagram for a data conversion unit according to another example embodiment.

Alternatively, however, as shown in FIG. 6, if a data conversion unit 6 has a PATA connector 11 and a PATA connector 13, and an ASIC 40 has a PATA device I/F 30 and a PATA host I/F 37, then the electronic apparatus 2 can be coupled to a PATAHDD 7 (or external memory unit) having a PATA interface by interposing the data conversion unit 6 between the electronic apparatus 2 and PATAHDD 7.

Such configuration can similarly be used for providing the above-described functions to the electronic apparatus 2.

Figure 7:
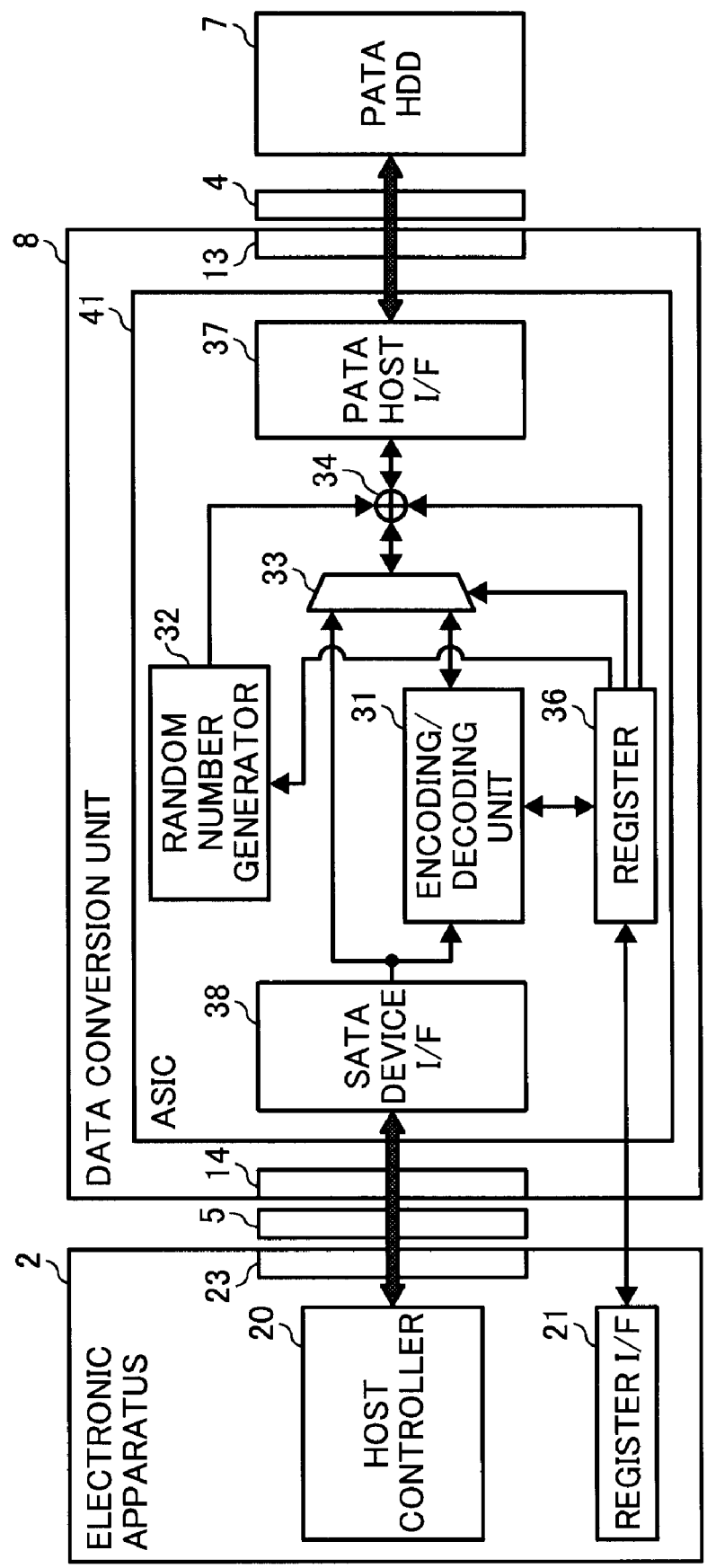
FIG. 7 is a block diagram for a data conversion unit according to another example embodiment.

Moreover, as shown in FIG. 7, if a data conversion unit 8 has a SATA connector 14 and a PATA connector 13, and an ASIC 41 has a SATA device I/F 38 and a PATA host I/F 37, the electronic apparatus 2 can be coupled to a PATAHDD 7 (or external memory unit) having a PATA interface by interposing the data conversion unit 8 between the electronic apparatus 2 and PATAHDD 7.

Such configuration can similarly be used for providing the above-described functions to the electronic apparatus 2.

Figure 8:
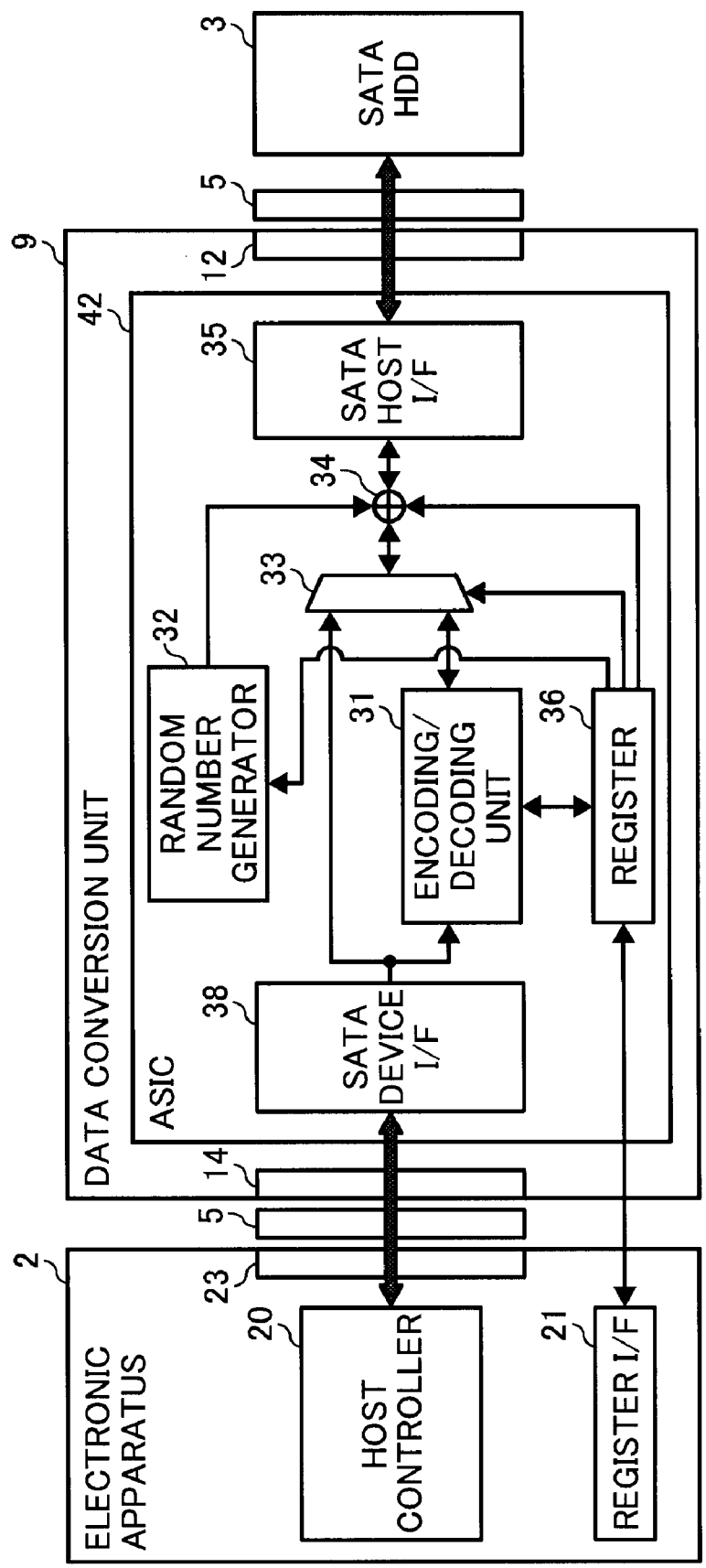
FIG. 8 is a block diagram for a data conversion unit according to another example embodiment.

In addition, as shown in FIG. 8, if a data conversion unit 9 has a SATA connector 14 and a SATA connector 12, and an ASIC 42 has a SATA device I/F 38 and a SATA host I/F 35, the electronic apparatus 2 can be coupled to a SATAHDD 3 having a SATA interface by interposing the data conversion unit 9 between the electronic apparatus 2 and SATAHDD 3.

Such configuration can similarly be used for providing the above-described functions to the electronic apparatus 2.

In the foregoing description, the external memory unit is an HDD. However, the external memory unit is of any type, such as a data writing/reading unit for flexible disk, an MO (magneto optical disk), and an optical disk such as a CD (compact disc) and a DVD (digital versatile disc).

Further, the external memory unit is a memory card interface for data writing/reading for a non-volatile memory card such as a SD (secure digital) card.

Figure 9:
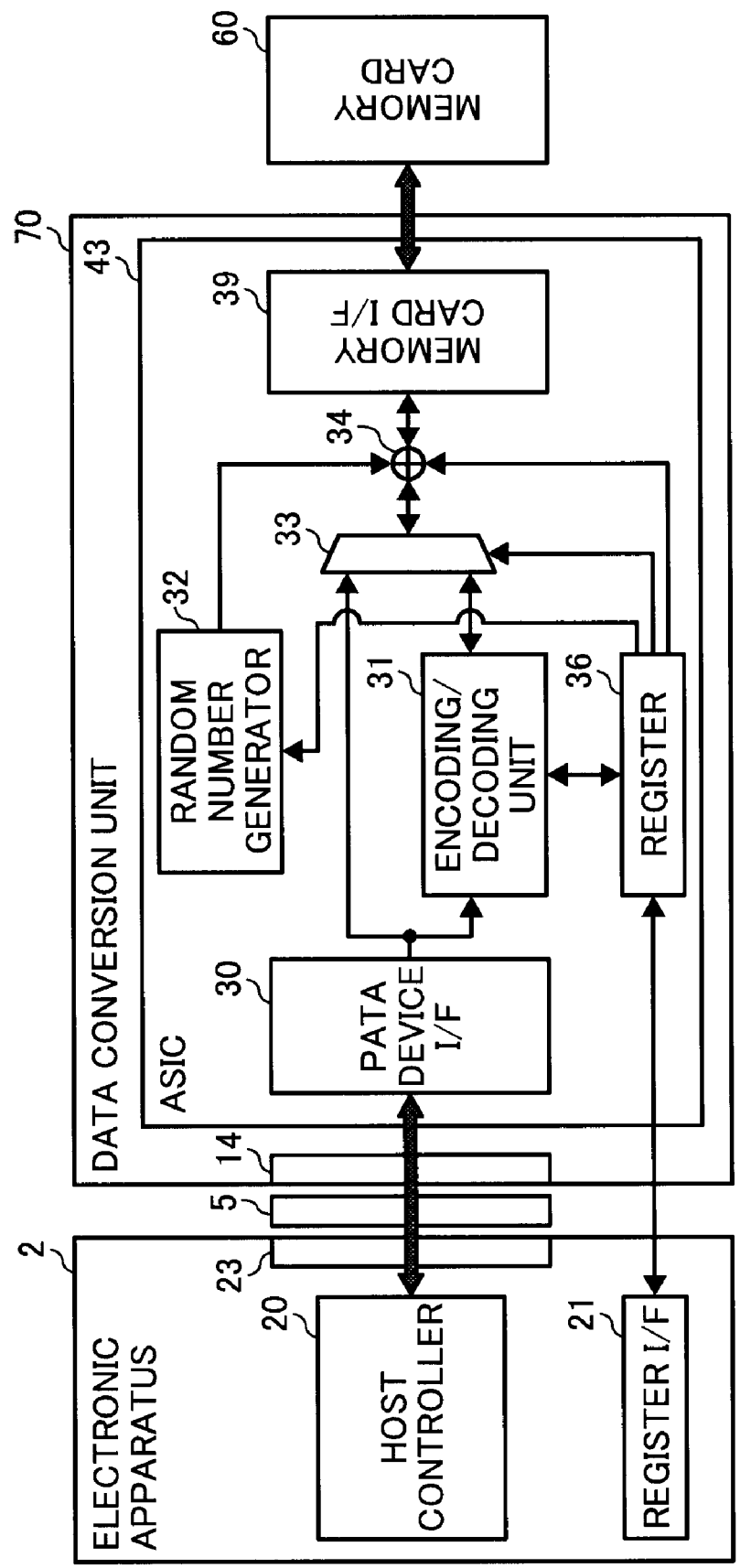
FIG. 9 is a block diagram for a data conversion unit according to another example embodiment.

FIG. 9 is a block diagram of another data conversion unit 70. The data conversion unit 70 has a configuration similar to the data conversion unit 1 shown in FIG. 1 and other data conversion units shown in FIGS. 6 to 8, as indicated by similar reference characters.

The data conversion unit 70 includes an ASIC 44 having a memory card interface 39 to be connected to a memory card 60 (e.g., an SD card), with which data is transmitted between the electronic apparatus 2 and the memory card 60. Such memory card interface 39 and memory card 60 is used as an external memory unit and external memory in the data conversion unit 70.

As in the previously described configurations, the electronic apparatus 2 and memory card 60 can perform certain types of data processing, such as data conversion or data encoding/decoding.

Although the electronic apparatus 2 shown in FIG. 9 has a PATA device I/F, the electronic apparatus 2 can be provided with a SATA device I/F as required.

As described above, the data conversion units according to the example embodiments can be interposed between an electronic apparatus and an external memory unit having a given interface (e.g., parallel ATA interface or serial ATA interface). Further, the data conversion units according to the example embodiments can be interposed between an electronic apparatus and a non-volatile memory card.

Such configurations can easily accommodate an added security function without requiring an additional expansion slot for the electronic apparatus, thus enabling an existing such expansion slot to be used for connecting some other optional device.

Further, such configuration can provide a security function using a hardware configuration that places no excessive extra load on the CPU of the electronic apparatus.

Further, such configuration can provide a data conversion function between a parallel ATA interface and serial ATA interface, a data conversion function between a parallel ATA interface and memory card interface, and a data conversion function between a serial ATA interface and memory card interface, thus enabling a range of types of external memory units or memory cards that can be used with the electronic apparatus to be expanded.

Further, because such configuration can encode or decode data with a minimum recording length, overhead for decoding encoded data during a random read out process can be reduced.

Further, an electronic apparatus such as an image forming apparatus having the above-described ASIC can store data or information such as image data, communication data, classified data and the like to a memory medium such as a hard disk, an optical disk, a memory card or the like by encoding data without decreasing processing efficiency of the electronic apparatus.

Further, an electronic apparatus having the above-described ASIC can delete data by overwriting the data with random number data, by which data security can be enhanced.

Further, because the above-described ASIC and related software program for such ASIC can be easily added to the electronic apparatus, an electronic apparatus presently used by a user can enhance its security function easily. In other words, the user can obtain a function-enhanced electronic apparatus without replacing the entire electronic apparatus.

Further, an electronic apparatus such as an image forming apparatus having the above-described ASIC can store information such as image data, communication data, classified data to removable memory media such as DVD, CD or the like by encoding data without decreasing the processing efficiency of the electronic apparatus.

Further, the above-described data conversion unit can be installed in an external memory unit as required.

The data conversion unit according to an example embodiment may further include a data retransmission function. Such data retransmission function is used when a data transmission error occurs during data transmission between an electronic apparatus and an external memory unit or memory card.

With such data retransmission function, the electronic apparatus and the external memory unit (or memory card) need not retransmit data even if a data transmission error occurs.

With such data retransmission function, the data conversion unit can temporarily store data transmitted between the electronic apparatus and the external memory unit or memory card, and retransmit data when a data transmission error occurs.

Further, such data conversion unit may have a retry function, which can repeat such data retransmission for a given number of times or until a given condition is met.

A description is now given of a data conversion unit having the data retransmission function described above, with reference to FIG. 10.

Figure 10:
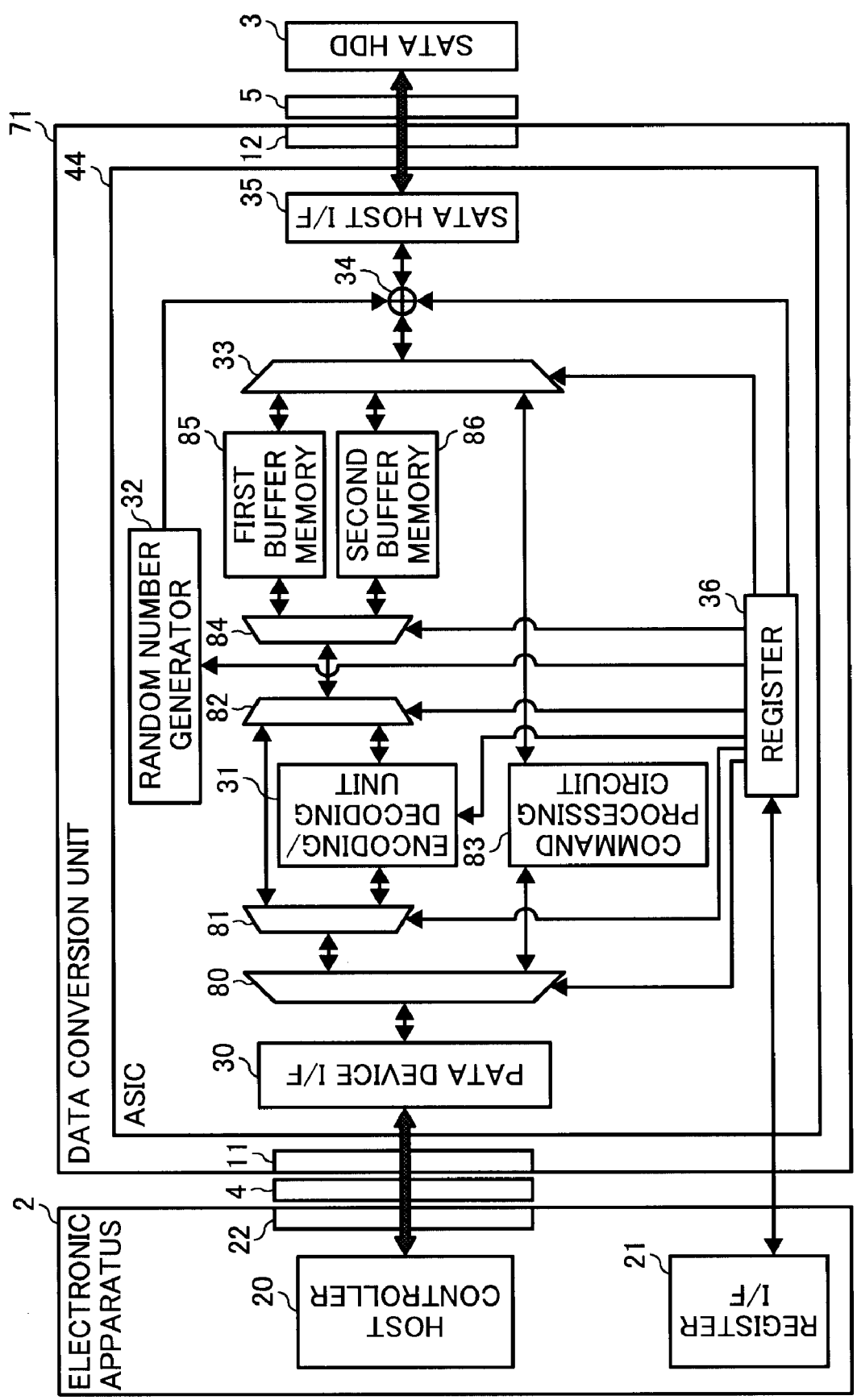
FIG. 10 is a block diagram for a data conversion unit according to another example embodiment.

FIG. 10 shows a block diagram of a data conversion unit 71 having the data retransmission function described above. Constituent components of the data conversion unit 71 similar or identical to those used in the data conversion unit 1 of FIG. 1 are identified by similar or identical reference characters and redundant descriptions thereof omitted.

The data conversion unit 71 includes an ASIC 44 having a third selector 80, a fourth selector 81, a fifth selector 82, a command processing circuit 83, a sixth selector 84, a first buffer memory 85, and a second buffer memory 86, added to the configuration of the data conversion unit 1 shown in FIG. 1.

The first selector 33 in the data conversion unit 71 receives data from any one of the first buffer memory 85, the second buffer memory 86, and the command processing circuit 83.

Based on a setting of the register 36, the first selector 33 selectively outputs data, input from the first buffer memory

85, the second buffer memory 86, or the command processing circuit 83, to the second selector 34.

Further, the first selector 33 selectively outputs data, input to the first selector 33 from the second selector 34, to either the first buffer memory 85 or the second buffer memory 86.

The register 36 in the data conversion unit 71 is used to select and switch a data path to the third selector 80, fourth selector 81, fifth selector 82, and sixth selector 84 in addition to the above-described functions in the data conversion units 1 or 70.

The third selector 80 is used to selectively output data input from the PATA device I/F 30, the fourth selector 81, or the command processing circuit 83 based on a setting of register 36.

The fourth selector 81 is used to selectively output data, input from the third selector 80, the fifth selector 82, or the encoding/decoding unit 31 based on the setting of the register 36.

The fifth selector 82 is used to selectively output data input from the fourth selector 81, the encoding/decoding unit 31, or the sixth selector 84 based on the setting of the register 36.

The command processing circuit 83 prepares a command based on a command instruction received from the electronic apparatus 2, and outputs a prepared command to the SATAHDD 3.

The sixth selector 84 is used to selectively output data, input from the fifth selector 82, to either the first buffer memory 85 or the second buffer memory 86 based on the setting of the register 36.

Further, the sixth selector 84 is used to output data, input from the first buffer memory 85 or the second buffer memory 86, to the fifth selector 82.

The first buffer memory 85 and the second buffer memory 86 have a given storage capacity to store a given amount of data such as data for 128 sectors, and temporarily store data, transmitted between the electronic apparatus 2 and the SATAHDD 3. As shown in FIG. 10, the data conversion unit 71 may include a plurality of buffer memories, for example.

Further, when the electronic apparatus 2 reads out data from the SATAHDD 3 or writes data to the SATAHDD 3, the register I/F 21 outputs mode or parameter conditions of the first selector 33, the third selector 80, the fourth selector 81, the fifth selector 82, and the sixth selector 84 to the register 36 in the data conversion unit 71.

A description is now given of a data read-out operation carried out by the data conversion unit 71.

In the following description, "N" represents a number of sectors in the SATAHDD 3, used for data processing such as data reading and data writing. Because such number of sectors "N" is matched to a total amount of data to be read or written for the SATAHDD 3, "N" may also express an amount of data to be read from or written to the SATAHDD 3.

In the following phases a1 to a6, an operation of reading a given data amount of between 129 sectors and 256 sectors (i.e., N>128) from the SATAHDD 3 is described.

"Phase a1"

When the host controller 20 of electronic apparatus 2 issues (or outputs) a read command for reading data stored in the SATAHDD 3 for between 129 sectors and 256 sectors (N>128) to the data conversion unit 71, such read command is received by the PATA device I/F 30 of data conversion unit 71 and further transmitted to the command processing circuit 83 via the third selector 80.

"Phase a2"

The command processing circuit 83 prepares a first read command for a first 128-sector in the N sectors (N>128), and issues (or outputs) the first read command to the SATA host I/F 35 via the first selector 33 and the second selector 34.

Because a maximum amount of data that can be transmitted from the SATAHDD 3 to the electronic apparatus 2 in a single transmission is 128 sectors, the data needs to be divided for transmitting the total amount of data (i.e., N>128) from the SATAHDD 3 to the electronic apparatus 2.

The first read command is used to read data for first 128-sector in the N sectors (i.e., N>128).

When the SATA host I/F 35 receives such first read command from the command processing circuit 83, the SATA host I/F 35 issues such first read command to the SATAHDD 3.

If such first read command fails to be issued, the SATA host I/F 35 retransmits such first read command a given number of times. Such given number of retries is set in advance.

"Phase a3"

When the SATAHDD 3 receives the first read command for the first 128-sector from the data conversion unit 71, the SATAHDD 3 reads out a first target data and transmits the first target data to the data conversion unit 71. The first target data is data requested by the first read command.

When the data conversion unit 71 receives the first target data requested by the first read command (i.e., data for first 128-sector) from the SATAHDD 3 via the SATA host I/F 35, the first selector 33 selects a path to the first buffer memory 85, and stores the first target data in the first buffer memory 85 via the second selector 34 and the first selector 33.

If such data transmission from the SATAHDD 3 fails and data cannot be transmitted correctly, the data conversion unit 71 repeats the process from phase a2 for a given number of times to receive the first target data from the SATAHDD 3, wherein such given number of retries is set in advance.

"Phase a4"

When the data conversion unit 71 stores the first target data for the first 128 sector in the first buffer memory 85, the command processing circuit 83 prepares a second read command, and issues the second read command to the SATA host I/F 35 via the first selector 33 and second selector 34.

Because the total amount of data to be transmitted from the SATAHDD 3 to the electronic apparatus 2 exceeds 128 sectors as described above, there still remains data that cannot be transmitted with the first read command that needs to be transmitted to the electronic apparatus 2.

Therefore, the second read command is used to read data for such remaining data from the SATAHDD 3. An amount of remaining data is expressed as "remaining data amount=N−128" because the first 128-sector data has already been transmitted from the SATAHDD 3.

When the SATA host I/F 35 receives the second read command from the command processing circuit 83, the SATA host I/F 35 issues the second read command to the SATAHDD 3.

If such second read command fails to be issued, the SATA host I/F 35 retransmits the second read command a given number of times, wherein such given number of retries is set in advance.

"Phase a5"

When the SATAHDD 3 receives the second read command for the remaining data of "N−128" from the data conversion unit 71, the SATAHDD 3 reads out a second target data and transmits the second target data to the data conversion unit 71. The second target data is data requested by the second read command.

When the data conversion unit 71 receives the second target data requested by the second read command from the SATAHDD 3 (i.e., data for N−128) via the SATA host I/F 35, the first selector 33 selects a path to the second buffer memory 86, and stores the second target data in the second buffer memory 86 via the second selector 34 and first selector 33.

If such data transmission from the SATAHDD 3 fails and data cannot be transmitted correctly, the data conversion unit 71 repeats the process from phase a4 for a given number of times to receive the second target data from the SATAHDD 3, wherein such given number of times is set in advance.

"Phase a6"

When the data conversion unit 71 stores the first and the second target data to the first buffer memory 85 and the second buffer memory 86, respectively, as requested by the read commands from the electronic apparatus 2, the data stored in the first buffer memory 85 and the second buffer memory 86 is output sequentially to the electronic apparatus 2 by setting a data path with selectors including the sixth selector 84.

If the target data is encoded data, the data is decoded by the encoding/decoding unit 31 and output to the electronic apparatus 2. If the target data is not encoded data, such data is output to the electronic apparatus 2 as is.

A description is now given of another data read-out operation by the data conversion unit 71.

In the following phases b1 to b4, a data reading operation from the SATAHDD 3 with 128 sectors or less (i.e., N≦128) is described.

"Phase b1"

When the host controller 20 of electronic apparatus 2 issues (or outputs) a read command for reading data, stored in the SATAHDD 3 for N sectors (N≦128), to the data conversion unit 71, such read command is received by the PATA device I/F 30 of the data conversion unit 71 and transmitted to the command processing circuit 83 via the third selector 80.

"Phase b2"

The command processing circuit 83 prepares a read command for N sectors (N≦128), and issues (or outputs) the read command to the SATA host I/F 35 via the first selector 33 and the second selector 34.

When the SATA host I/F 35 receives such read command from the command processing circuit 83, the SATA host I/F 35 issues such read command to the SATAHDD 3.

If such read command fails to be issued, the SATA host I/F 35 retransmits such read command a given number of times, wherein such given number of retries is set in advance.

"Phase b3"

When the SATAHDD 3 receives the read command for N sectors (N≦128) from the data conversion unit 71, the SATAHDD 3 reads out a target data and transmits the target data to the data conversion unit 71.

When the data conversion unit 71 receives the target data requested by the read command (i.e., data for 128 sectors or less) from the SATAHDD 3 via the SATA host I/F 35, the first selector 33 selects a path to the first buffer memory 85 and stores the target data in the first buffer memory 85 via the second selector 34 and the first selector 33.

If such data transmission from the SATAHDD 3 fails and data cannot be transmitted correctly, the data conversion unit 71 repeats the process from phase b2 for a given number of times to receive the target data from the SATAHDD 3, wherein such given number of times is set in advance.

"Phase b4"

When the data conversion unit 71 stores the target data for the N sectors (N≦128) to the first buffer memory 85 requested by the read command from the electronic apparatus 2, the target data stored in the first buffer memory 85 is output to the electronic apparatus 2 by setting a data path with selectors including the sixth selector 84.

If such target data is encoded data, the data is decoded by the encoding/decoding unit 31 and output to the electronic apparatus 2. If such target data is not encoded data, such data is output to the electronic apparatus 2 as is.

A description is now given of a data writing operation carried out by the data conversion unit 71.

In the following phases c1 to c7, a data writing operation for 129 sectors or more (i.e., N>128) to the SATAHDD 3 is described. In such case, the SATAHDD 3 may need 129 sectors or more to store a total amount of data to be written to the SATAHDD 3.

"Phase c1"

When the host controller 20 of electronic apparatus 2 issues (or outputs) a write command for data, which may exceed 129 sectors (N>128) in the SATAHDD 3, to the data conversion unit 71, such read command is received by the PATA device I/F 30 of the data conversion unit 71 and transmitted to the command processing circuit 83 via the third selector 80.

"Phase c2"

The command processing circuit 83 prepares a first write command for a first 128-sector in the N sectors (N>128), and issues (or outputs) the first write command to the SATA host I/F 35 via the first selector 33 and the second selector 34.

Because the maximum amount of data that can be transmitted from the electronic apparatus 2 to the SATAHDD 3 in a single transmission is 128 sectors, the data needs to be divided for transmitting the total amount of data (i.e., N>128) from the electronic apparatus 2 to the SATAHDD 3.

The first write command is used to write data for first 128-sector in the N sectors (i.e., N>128).

When the SATA host I/F 35 receives such first write command from the command processing circuit 83, the SATA host I/F 35 issues such first write command to the SATAHDD 3.

If such first write command fails to be issued, the SATA host I/F 35 retransmits the first write command a given number of times, wherein such given number of retries is set in advance.

During such process for first write command, the data conversion unit 71 receives data corresponding to the first write command from the electronic apparatus 2, wherein such data is to be transmitted to the SATAHDD 3.

When such data needs to be encoded, a data path is switched in the third selector 80 and the fourth selector 81 and the data output to the encoding/decoding unit 31.

The encoding/decoding unit 31 encodes the data and outputs the encoded data to the fifth selector 82, a data path is switched in the sixth selector 84, and data for the first write command (i.e., data for first 128-sector) is stored in the first buffer memory 85.

Further, when data does not need to be encoded but only stored in the SATAHDD 3 as is, a data path is switched in the third selector 80 and fourth selector 81, such data is output to the fifth selector 82 as is, a data path is switched in the sixth selector 84, and data for the first write command (i.e., data for first 128-sector) is stored in the first buffer memory 85.

"Phase c3"

When the SATAHDD 3 receives the first write command for the first 128-sector from the data conversion unit 71, the SATAHDD 3 stands by for the data for the first write command (i.e., data for first 128-sector).

When the command processing circuit 83 successfully issues the first write command for the first 128 sector, the data conversion unit 71 outputs the data for the first write command (i.e., data for first 128-sector) stored in the first buffer memory 85 to the SATA host I/F 35 via the first selector 33 and the second selector 34. The SATA host I/F 35 outputs such data to the SATAHDD 3.

If such data transmission to the SATAHDD 3 is successfully performed, the process proceeds to phase c5. If such data transmission to the SATAHDD 3 fails and data cannot be transmitted correctly, the process proceeds to phase c4.

"Phase c4"

If data transmission to the SATAHDD 3 fails and data cannot be transmitted correctly, the data conversion unit 71 repeats data transmission for a given number of times to transmit the data to the SATAHDD 3, wherein such given number of times is set in advance.

During such process for data writing, the data conversion unit 71 does not receive other commands from the host controller 20 of the electronic apparatus 2.

"Phase c5"

When the data conversion unit 71 successfully outputs data for the first write command (i.e., data for first 128-sector) from the first buffer memory 85 to the SATAHDD 3, the command processing circuit 83 prepares a second write command, and issues the second write command to the SATA host I/F 35 via the first selector 33 and the second selector 34.

Because the total amount of data to be transmitted from the electronic apparatus 2 to the SATAHDD 3 exceeds 128 sectors as above mentioned, there still remains data that cannot be transmitted with the first write command that needs to be transmitted to the SATAHDD 3.

Therefore, the second write command is used to write data for such remaining data to the SATAHDD 3. The amount of remaining data is expressed as "remaining data amount=N−128" because the first 128-sector data has already been transmitted to the SATAHDD 3.

When the SATA host I/F 35 receives such second write command from the command processing circuit 83, the SATA host I/F 35 issues the second write command to the SATAHDD 3.

If such second write command fails to be issued, the SATA host I/F 35 retransmits the second write command a given number of times, wherein such given number of retries is set in advance.

During such second write command process, the data conversion unit 71 receives data corresponding to the second write command from the electronic apparatus 2, wherein such data is to be transmitted to the SATAHDD 3.

When such data needs to be encoded, a data path is switched in the third selector 80 and fourth selector 81, and such data is output to the encoding/decoding unit 31.

The encoding/decoding unit 31 encodes the data and outputs the encoded data to the fifth selector 82, a data path is switched in the sixth selector 84, and data for the second command (i.e., remaining data of "N−128") is stored in the second buffer memory 86.

Further, when data need not be encoded but only stored in the SATAHDD 3 as is, a data path is switched in the third selector 80 and fourth selector 81 and such data is output to the fifth selector 82 as is, and a data path is switched in the sixth selector 84 and data for the second write command (i.e., remaining data of "N−128") is stored in the second buffer memory 86.

During such process, the data conversion unit 71 does not receive other commands from the host controller 20 of the electronic apparatus 2.

"Phase c6"

When the SATAHDD 3 receives the second write command for the remaining data of "N−128" from the data conversion unit 71, the SATAHDD 3 stands by for the remaining data of "N−128" for the second write command.

When the command processing circuit 83 successfully issues the second write command for the remaining data of "N−128", the data conversion unit 71 outputs the remaining data of "N−128" stored in the second buffer memory 86 to the SATA host I/F 35 via the first selector 33 and the second selector 34. The SATA host I/F 35 output such data to the SATAHDD 3.

If such data transmission to the SATAHDD 3 is successfully performed, then the write command issued by the electronic apparatus 2 is completed correctly, enabling the data conversion unit 71 to be ready to receive a new command from the electronic apparatus 2.

If such data transmission to the SATAHDD 3 fails and data cannot be transmitted correctly, the process proceeds to phase c5 and is repeated, during which time the data conversion unit 71 does not receive other commands from the host controller 20 of the electronic apparatus 2.

A description is now given of another data writing operation by the data conversion unit 71.

In the following phases d1 to d3, a data writing operation for the SATAHDD 3 with 128 sectors or less (i.e., N≦128) is described. In such case, the SATAHDD 3 may need 128 sectors or less to store a total amount of data to be written to the SATAHDD 3.

"Phase d1"

When the host controller 20 of electronic apparatus 2 issues (or outputs) a write command for data, which is 128 sectors or less (N≦128) in the SATAHDD 3, to the data conversion unit 71, such write command is received by the PATA device I/F 30 of data conversion unit 71 and transmitted to the command processing circuit 83 via the third selector 80.

"Phase d2"

The command processing circuit 83 prepares a write command for N sectors (N≦128), and issues (or outputs) the write command to the SATA host I/F 35 via the first selector 33 and the second selector 34.

When the SATA host I/F 35 receives such write command from the command processing circuit 83, the SATA host I/F 35 issues such write command to the SATAHDD 3.

If such write command fails to be issued, the SATA host I/F 35 retransmits such write command a given number of times, wherein such given number of retries is set in advance.

During such write command process, the data conversion unit 71 receives data corresponding to the write command from the electronic apparatus 2.

When such data needs to be encoded, a data path is switched in the third selector 80 and the fourth selector 81, and such data is output to the encoding/decoding unit 31.

The encoding/decoding unit 31 encodes the data and outputs the encoded data to the fifth selector 82, a data path is switched in the sixth selector 84, and data for the write command (i.e., data for 128 sectors or less) is stored in the first buffer memory 85.

Further, when such data does not need to be encoded but only stored in the SATAHDD 3 as is, a data path is switched in the third selector 80 and fourth selector 81, such data is output to the fifth selector 82 as is, a data path is switched in the sixth selector 84, and data for N sectors (N≦128) is stored in the first buffer memory 85.

"Phase d3"

When the SATAHDD 3 receives the write command for N sectors (N≦128) from the data conversion unit 71, the SATAHDD 3 stands by for the data for the write command write (i.e., data for 128 sectors or less).

When the command processing circuit 83 successfully issues the write command for N sectors (N≦128), the data conversion unit 71 outputs the data for the write command (i.e., data for 128 sectors) stored in the first buffer memory 85 to the SATA host I/F 35 via the first selector 33 and the second selector 34. The SATA host I/F 35 may output such data to the SATAHDD 3.

If such data transmission to the SATAHDD 3 is successfully performed, a write command instructed by the electronic apparatus 2 is completed correctly, enabling the data conversion unit 71 to be ready to receive a new command from the electronic apparatus 2.

If such data transmission to the SATAHDD 3 fails and data cannot be transmitted correctly, the process proceeds to phase d2 and is repeated, during which time the data conversion unit 71 does not receive other commands from the host controller 20 of the electronic apparatus 2.

As described above, a buffer memory having a capacity corresponded to a maximum capacity for a size of one-time data transmission between the electronic apparatus 2 and the SATAHDD 3 is installed in the ASIC 44 of the data conversion unit 71, such that even if a communication error occurs between the electronic apparatus 2 and the SATAHDD 3, the electronic apparatus 2 does not need to retransmit data to the data conversion unit 71.

Further, such buffer memory may include a plurality of buffer memories having a relatively smaller capacity, by which overhead for retransmission when communication error occurs can be reduced.

In the foregoing description, although two buffer memories having a storage capacity of 128 sectors each are configured in the data conversion unit 71, the number of buffer memories may be changed as required. For example, four buffer memories having a storage capacity of 64 sectors each may be configured in the data conversion unit.

Figure 11:
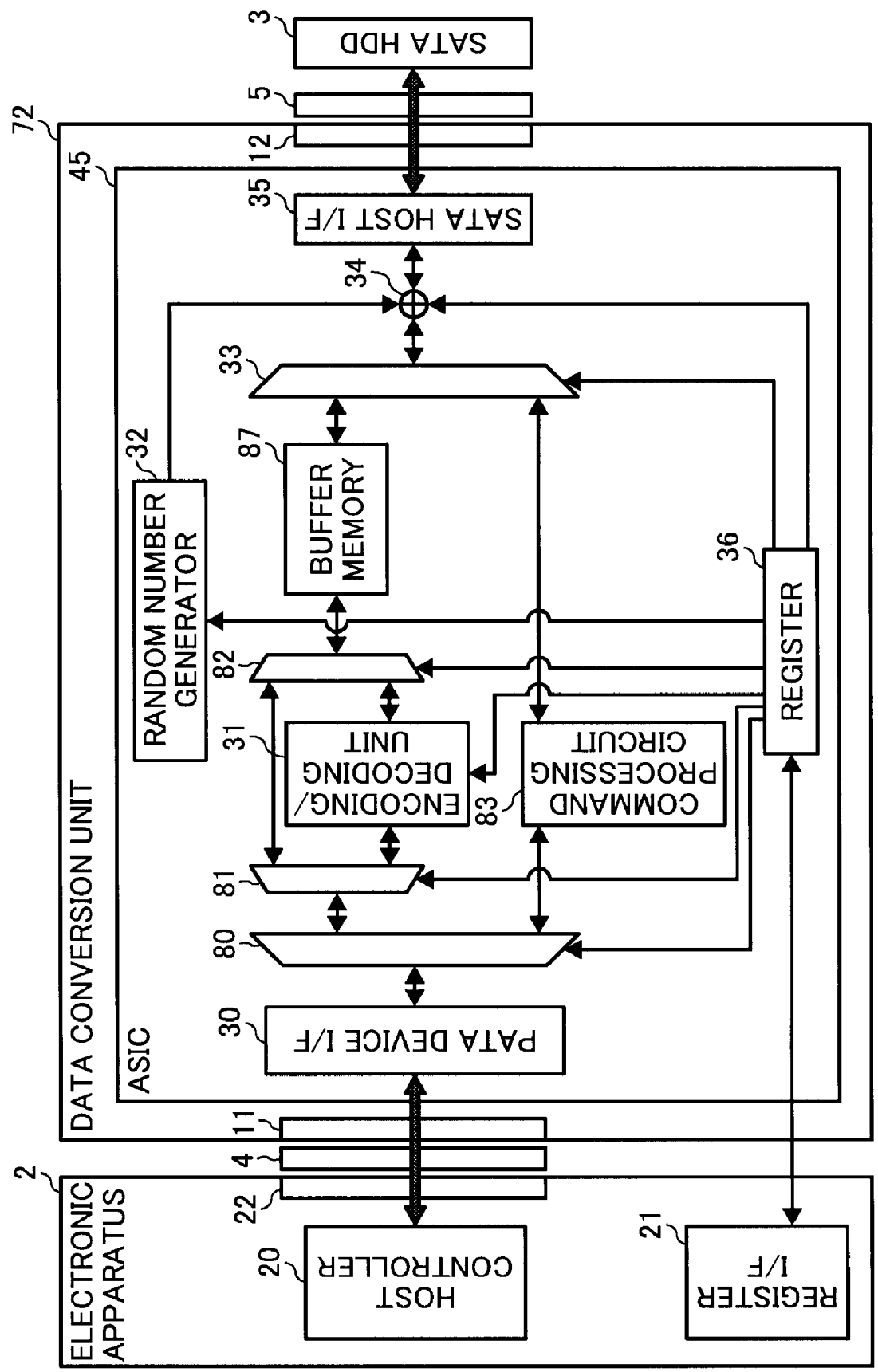
FIG. 11 is a block diagram for a data conversion unit according to another example embodiment.

A description is now given of another data conversion unit 72 according to an example embodiment with reference to FIG. 11. The data conversion unit 72 may include one buffer memory instead of the plurality of buffer memories provided in the data conversion unit 71 shown in FIG. 10.

FIG. 11 is a block diagram of the data conversion unit 72. As shown in FIG. 11, the data conversion unit 72 has a configuration similar to that of the data conversion unit 71 shown in FIG. 10, with identical or similar components designated using identical or similar reference numerals and redundant descriptions thereof omitted.

The data conversion unit 72 includes an ASIC 45 provided with a buffer memory 87 between the fifth selector 82 and the first selector 33 instead of providing the sixth selector 84, first buffer memory 85, and second buffer memory 86 in the ASIC 44 of the data conversion unit 71 shown in FIG. 10.

A description is now given of a data writing operation by the data conversion unit 72.

In the following phases e1 to e3, a data writing operation for 128 sectors or less (i.e., N≦128) to the SATAHDD 3 is described. In such case, the SATAHDD 3 may need 128 sectors or less to store a total amount of data to be written to the SATAHDD 3. The buffer memory 87 has a storage capacity of 128 sectors, for example.

"Phase e1"

When the host controller 20 of electronic apparatus 2 issues (or outputs) a write command for data, which is 128 sectors or less (N≦128) in the SATAHDD 3, to the data conversion unit 72, such write command is received by the PATA device I/F 30 of the data conversion unit 72 and transmitted to the command processing circuit 83 via the third selector 80.

"Phase e2"

The command processing circuit 83 prepares a write command for N sectors (N≦128), and issues (or outputs) the write command to the SATA host I/F 35 via the first selector 33 and the second selector 34.

When the SATA host I/F 35 receives the write command from the command processing circuit 83, the SATA host I/F 35 issues such write command to the SATAHDD 3.

If such write command fails to be issued, the SATA host I/F 35 retransmits the write command a given number of times, wherein such given number of retries is set in advance.

During such write command process, the data conversion unit 72 receives data corresponding to the write command from the electronic apparatus 2.

When such data needs to be encoded, a data path is switched in the third selector 80 and the fourth selector 81 and such data is output to the encoding/decoding unit 31.

The encoding/decoding unit 31 encodes the data and outputs the encoded data to the fifth selector 82, and such encoded data for the write command (i.e., data for 128 sectors or less) is stored in the buffer memory 87.

When such data need not be encoded but only stored in the SATAHDD 3 as is, a data path is switched in the third selector 80 and the fourth selector 81, such data is output to the fifth selector 82 as is, and data for N sectors (N≦128) is stored in the buffer memory 87 as is.

"Phase e3"

When the SATAHDD 3 receives the write command for N sectors (N≦128) from the data conversion unit 72, the SATAHDD 3 stands by for data for the write command write (i.e., data for 128 sectors or less).

When the command processing circuit 83 successfully issues the write command for N sectors (N≦128), the data conversion unit 72 outputs the data for the write command (i.e., data for 128 sectors) stored in the buffer memory 87 to the SATA host I/F 35 via the first selector 33 and the second selector 34. The SATA host I/F 35 outputs such data to the SATAHDD 3.

If such data transmission to the SATAHDD 3 is successfully performed, a write command instructed by the electronic apparatus 2 is completed correctly and the data conversion unit 72 is made ready to receive a new command from the electronic apparatus 2.

If such data transmission to the SATAHDD 3 fails and data cannot be transmitted correctly, the process proceeds to phase e2 and is repeated, during which process the data conversion unit 72 does not receive other commands from the host controller 20 of the electronic apparatus 2.

In a data reading operation carried out by the data conversion unit 72, a storage capacity of the buffer memory 87 is set to a given value which corresponds to one-time data transmission between the SATAHDD 3 and the electronic apparatus 2 when the electronic apparatus 2 reads out data from the SATAHDD 3.

For example, if the buffer memory 87 has a storage capacity of 128 sectors or more, the electronic apparatus 2 can read out data of 128 sectors or more from the SATAHDD 3 in a single data transmission.

A description is now given of a comparison of data transmission for writing data to the SATAHDD 3 having 129 sectors or more between a data conversion unit having two buffer memories and a data conversion unit having one buffer memory. An example of data transmission for 256 sectors is used for such comparison.

If an error probability of data transmission for 128 sectors on the SATA host I/F 35 is assumed to be $10^{-12}$, then an error probability of data transmission for 256 sectors is assumed to be $2 \times 10^{-11}$, which is twice that for 128 sectors.

Further, when one error occurs during data transmission for 256 sectors, a data size for one retransmission is 128 sectors in case of two buffer memories and 256 sectors in case of one buffer memory, which is twice that for the two buffer memories.

Because the error probability of data transmission is proportional to the size of one-time data transmission, the error probability of data transmission of 256 sectors is twice as great as the error probability of data transmission of 128 sectors. Accordingly, a ratio of error probability of data transmission for 256 sectors and 128 sectors is 2:1.

Further, a total transmitted data size including one data retransmission is 256+128=384 sectors in case of two buffer memories and 256×2=512 sectors in case of one buffer memory.

As such, by providing a data conversion unit having a data retransmission function, even if a communication error occurs between the electronic apparatus 2 and the SATAHDD 3, the electronic apparatus 2 does not need to retransmit data, which is preferable for efficient data transmission.

Such retransmission function can be provided for all data conversion units described in this disclosure.

Further, although a serial interface, a parallel interface, and memory card interface are used in the foregoing description, the data conversion unit according to the example embodiments may be used with other interfaces, such as an IEEE (Institute of Electrical and Electronic Engineers) interface and a USB (universal serial bus) interface.

The data conversion unit and data conversion method according to the example embodiments described above may be employed in data processing apparatuses such as an image processing apparatus (e.g. printer, facsimile, copier, multi-functional apparatus), a personal computer (e.g., desktop computer, notebook computer), or the like.

Numerous additional modifications and variations are possible in light of the above teachings, and it is therefore to be understood that, within the scope of the appended claims, the disclosure of the present invention may be practiced otherwise than as specifically described herein.

What is claimed is:

1. A data conversion unit, comprising:
   a first input/output unit;
   a second input/output unit;
   an encoder configured to encode data;
   a decoder configured to decode data;
   a random number generator configured to generate random number data; and
   a control unit configured to select a first setting function, a second setting function, and a third setting function,
   wherein, in the first setting function, the control unit sets to input data from the first input/output unit, to encode data by the encoder, and to output the encoded data from the second input/output unit,
   in the second setting function, the control unit sets to input data from the first input/output unit, to replace the data with the random number data generated by the random number generator, and to output the random number data from the second input/output unit;
   in the third setting function, the control unit sets to input encoded data from the second input/output unit, to decode the encoded data by the decoder, and to output the decoded data from the first input/output unit,
   the control unit selecting any one of the first setting function, the second setting function, and the third setting function based on a setting state set to the control unit.

2. The data conversion unit according to claim 1, wherein the first input/output unit and the second input/output unit input or output data in parallel.

3. The data conversion unit according to claim 1, wherein the first input/output unit and the second input/output unit input or output data serially.

4. The data conversion unit according to claim 1, wherein any one of the first input/output unit and the second input/output unit input or output data in parallel, and other one of the first input/output unit and the second input/output unit input or output data serially.

5. The data conversion unit according to claim 1, wherein the encoder encodes data in a minimum data amount set in advance.

6. The data conversion unit according to claim 5, wherein the minimum data amount data is a minimum recording length.

7. An electronic apparatus comprising the data conversion unit according to claim 1.

8. The electronic apparatus according to claim 7, wherein the electronic apparatus includes any one of a copier, a printing apparatus, a facsimile, a computer, or a multi-functional apparatus having copying, printing, facsimile, and computing functions.

9. A method of data conversion comprising selecting any one of a first type processing, a second type processing, and a third type processing,
   wherein, in the first type processing, input data is encoded and the encoded data is output,
   in the second type processing, input data is replaced with random number data generated in advance and the random number data is output,
   in the third type processing, encoded data is input and decoded, and the decoded data is output.

10. The method according to claim 9, wherein the data is input and output in parallel.

11. The method according to claim 9, wherein the data is input and output serially.

12. The method according to claim 9, wherein the data is input in parallel and the data is output serially, or the data is input serially and the data is output in parallel.

13. The method according to claim 9, wherein the data is encoded in a minimum data amount set in advance.

14. The method according to claim 13, wherein the minimum data amount data is a minimum recording length.

* * * * *